US005773120A

United States Patent [19]
Deka et al.

[11] Patent Number: 5,773,120
[45] Date of Patent: Jun. 30, 1998

[54] LOOP MATERIAL FOR HOOK-AND-LOOP FASTENING SYSTEM

[75] Inventors: Ganesh Chandra Deka, Duluth; Robert Alan Cool, Alpharetta; David William Richards, Woodstock, all of Ga.

[73] Assignee: Kimberly-Clark Worldwide, Inc., Neenah, Wis.

[21] Appl. No.: 807,800

[22] Filed: Feb. 28, 1997

[51] Int. Cl.$^6$ .............................. B32B 3/06; A44B 1/04; A44B 11/25

[52] U.S. Cl. .......................... 428/99; 428/92; 428/100; 428/101; 428/143; 442/109; 442/364; 442/409; 442/411; 24/448; 24/451; 28/103; 156/155; 156/176; 156/279; 156/280; 156/290; 156/308.2

[58] Field of Search ............................. 428/92, 99, 100, 428/101, 143; 442/109, 361, 364, 409, 411; 24/448, 451; 28/103; 156/155, 176, 274, 280, 290, 308.2

[56] References Cited

U.S. PATENT DOCUMENTS

| | | | |
|---|---|---|---|
| D. 239,566 | 4/1976 | Vogt | D5/6 |
| D. 264,512 | 5/1982 | Rogers | D59/2 B |
| 3,016,599 | 1/1962 | Perry, Jr. | 28/78 |
| 3,341,394 | 9/1967 | Kinney | 161/72 |
| 3,655,862 | 4/1972 | Dorschner et al. | 264/290 |
| 3,692,618 | 9/1972 | Dorschner et al. | 161/172 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,855,046 | 12/1974 | Hansen et al. | 161/150 |
| 3,978,185 | 8/1976 | Butin et al. | 264/93 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,148,676 | 4/1979 | Paquette et al. | 156/181 |
| 4,340,563 | 7/1982 | Appel et al. | 264/518 |
| 4,405,297 | 9/1983 | Appel et al. | 425/72 |
| 4,434,204 | 2/1984 | Hartman et al. | 428/198 |
| 4,493,868 | 1/1985 | Meitner | 428/171 |
| 4,563,387 | 1/1986 | Takagi et al. | 428/300 |
| 4,627,811 | 12/1986 | Greiser et al. | 425/72 S |
| 4,644,045 | 2/1987 | Fowells | 526/348 |
| 4,663,200 | 5/1987 | Wisneski et al. | 428/22 |
| 4,931,343 | 6/1990 | Becker et al. | 428/100 |
| 5,108,820 | 4/1992 | Kaneko et al. | 428/198 |
| 5,336,552 | 8/1994 | Strack et al. | 428/224 |
| 5,342,647 | 8/1994 | Heindel et al. | 427/2.31 |
| 5,354,591 | 10/1994 | Ott et al. | 428/99 |
| 5,520,997 | 5/1996 | Pourahmady et al. | 428/228 |
| 5,565,011 | 10/1996 | Follett et al. | 51/297 |

FOREIGN PATENT DOCUMENTS

| | | |
|---|---|---|
| 586924 | 3/1994 | European Pat. Off. . |
| 6702927 | 9/1967 | Netherlands . |

OTHER PUBLICATIONS

"Superfine Thermoplastic Fibers" by V. A. Wente, Industrial and Engineering Chemistry, vol. 48, No. 8, pp. 1342–1346 (1956).

"Manufacture of Superfine Organic Fibers", by V. A. Wente et al., Navy Research Laboratory, Washington, D.C., NRL Report 4364 (111437), May 25, 1994, US Dept. of Commerce, Office of Technical Services.

"Melt Blowing—A One–Step Web Process for New Nonwoven Products" by R. R. Butin et al., Journal of the Technical Association of the Pulp and Paper Industry, vol. 56, No. 4, pp. 74–77 (1973).

"Thermodynamic Quantities Governing Melting", Chapter 11 in James E. Mark, Physical Properties of Polymers Handbook, American Institute of Physics, pp. 119–135 (1996).

Primary Examiner—Terrel Morris
Attorney, Agent, or Firm—William E. Maycock

[57] ABSTRACT

A loop material suitable for use in a hook-and-loop fastening system, which loop material includes a bonded carded web having a first side and a second side. The bonded carded web has a basis weight of from about 15 to about 140 grams per square meter and a thickness of from about 1 mm to about 15 mm. The bonded carded web may be thermally pattern bonded. The bonded carded web is composed of fibers having a denier per filament greater than 2, with from 100 to 0 percent by weight of the fibers being thermoplastic polymer fibers and from 0 to 100 percent by weight of the fibers being bicomponent thermoplastic polymer fibers. The first component of the bicomponent fibers has a melting point which is at least about 50° C. lower than the melting point of the second component. The bonded carded web has a plurality of interfiber bonds. The web also contains a binder at a level of from about 10 to about 50 percent by weight, based on the weight of the bonded carded web, in which the amount of binder at the second side is less than the amount of binder at the first side and the amount of binder at the first side is sufficient to permit multiple attachments of the first side of the bonded carded web to and releases from the hooks without significant distortion of the fibers at the first side. The present invention also provides a method of preparing a loop material suitable for use in a hook-and-loop fastening system.

43 Claims, 2 Drawing Sheets

LOOP MATERIAL FOR HOOK-AND-LOOP FASTENING SYSTEM

BACKGROUND OF THE INVENTION

The present invention relates to a loop material for use in a hook-and-loop fastening system.

Hook-and-loop fastening systems have become common in both consumer and industrial goods. On the consumer side, such systems are employed in shoes, jackets, coats, and the like, and even with some disposable goods, such as diapers. Hook-and-loop fastening systems also are used industrially, particularly for abrasive sheets, such as those employed for sanding, i.e., shaping and/or smoothing a surface. These abrasive sheets are capable of ready attachment and removal from a sanding tool, thereby permitting a worker to rapidly change from one grit size to another and to reuse any sheet removed from the tool. Such abrasive sheets typically consist of a loop material or substrate, to which abrasive grains (grit) have been adhered, typically through the use of an adhesive layer, often referred to in the art as the make coat.

The manufacture of a loop substrate for an abrasive sheet can be divided into two phases. The first phase involves the making of a loop material, i.e., the substrate or base sheet. The second phase typically consists of the application of the make coat, abrasive grains, and a size coat. There are several important parameters needed for a hook-and-loop attachment system used in the abrasives industry. For example, the attachment of the sheet to the sanding tool should have enough shear strength so that during use the loop material does not shear off. This is particularly important for abrasive sheets in disk form which are used on high-speed rotational tools. Similarly, the hook-and-loop attachment should have adequate peel strength such that in application the loop material will hold firmly together but can be peeled off with adequate force without tearing. Another important parameter is that the loop material, when disengaged or removed from the tool, should not allow any lint or loose fibers to stick to the hooks or become airborne. Such loose fibers or lint eventually may contaminate subsequent processes such as painting. Also, customer perception is important in such usage. Thus, the integrity of the loop material is an important parameter.

From the foregoing, it is clear that the loop material or base sheet plays an important role in the manufacture of abrasive sheets. The loop material must have loops in sufficient quantity and of a sufficient size to be engaged by the hooks of a hook-and-loop attachment system. At the same time, the loop material must have sufficient integrity to prevent it from disintegrating, tearing, or deforming during use and upon removal from the sanding tool. Woven or knitted fabrics may be used, but they are relatively expensive and may require a subsequent stitching or other operation to provide loops in the proper size and quantity. Nonwoven fabrics also may be used. While significantly lower in cost, such fabrics often lack sufficient peel strength and integrity. Accordingly, there is a need for a nonwoven loop material suitable for the manufacture of abrasive sheets which possess the requisite peel strength and integrity to withstand the stresses placed upon it during sanding operations.

SUMMARY OF THE INVENTION

The present invention addresses some of the difficulties and problems discussed above by providing a loop material suitable for use in a hook-and-loop fastening system. The loop material includes a bonded carded web having a first side and a second side. The bonded carded web has a basis weight of from about 15 to about 140 grams per square meter and a thickness of from about 1 mm to about 15 mm. The bonded carded web may be thermally pattern bonded. For example, the thermally pattern bonded area may include from about 5 to about 30 percent of the total area of the bonded carded web.

The bonded carded web is composed of fibers having a denier per filament greater than 2, with from 100 to 0 percent by weight of the fibers being thermoplastic polymer fibers and from 0 to 100 percent by weight of the fibers being bicomponent thermoplastic polymer fibers. The first component of the bicomponent fibers has a melting point which is at least about 50° C. lower than the melting point of the second component. For example, the bonded carded web may be comprised of from about 50 to 0 percent by weight of thermoplastic polymer fibers and from about 50 to 100 percent by weight of bicomponent thermoplastic polymer fibers. As another example, essentially all of the fibers in the bonded carded web may be bicomponent thermoplastic polymer fibers. As still another example, the bicomponent thermoplastic polymer fibers may be sheath-core fibers, with the sheath being comprised of the first component. For example, the bicomponent thermoplastic polymer fibers may be polyester fibers; that is, both components are polyesters having the required difference in melting points.

In addition, the bonded carded web has a plurality of interfiber bonds. When the bonded carded web includes bicomponent thermoplastic polymer fibers, the web will have a plurality of interfiber bonds formed between the first component of bicomponent thermoplastic polymer fibers and adjacent fibers. The web also contains a binder at a level of from about 10 to about 50 percent by weight, based on the weight of the bonded carded web, in which the amount of binder at the second side is less than the amount of binder at the first side and the amount of binder at the first side is sufficient to permit multiple attachments of the first side of the bonded carded web to and releases from the hooks without significant distortion of the fibers at the first side. For example, the binder may be present in the bonded carded web at a level of from about 25 to about 45 percent by weight, based on the weight of the bonded carded web.

The present invention also provides a method of preparing a loop material suitable for use in a hook-and-loop fastening system. The method includes providing a carded web having a first side and a second side. The carded web has a basis weight of from about 15 to about 140 grams per square meter and a thickness of from about 1 mm to about 15 mm. The carded web is composed of fibers having a denier per filament greater than 2, with from 100 to about 50 percent by weight of the fibers being thermoplastic polymer fibers and from about 50 to 100 percent by weight of the fibers being bicomponent thermoplastic polymer fibers. The first component has a melting point which is at least about 50° C. lower than the melting point of the second component.

In certain embodiments, essentially all of the fibers will be bicomponent thermoplastic polymer fibers. By way of example, the bicomponent thermoplastic polymer fibers may be sheath-core thermoplastic polymer fibers, with the sheath being comprised of the first component. As another example, the bicomponent thermoplastic polymer fibers may be polyester fibers.

The carded web is through air bonded at a temperature sufficient to form a plurality of interfiber bonds between the first component of the bicomponent thermoplastic polymer fibers and adjacent fibers. The adjacent fibers may be thermoplastic polymer fibers or bicomponent thermoplastic polymer fibers.

A binder then is applied to the bonded carded web at a level of from about 10 to about 50 percent by weight, based on the weight of the bonded carded web, under conditions sufficient to provide less binder at the second side than at the first side and an amount of binder at the first side which is sufficient to permit multiple attachments of the first side of the bonded carded web to and releases from the hooks without significant distortion of the fibers at the first side. For example, the binder may be present in the bonded carded web at a level of from about 25 to about 45 percent by weight, based on the weight of the bonded carded web.

The method of the present invention may further include thermally pattern bonding the bonded carded web. For example, the thermally pattern bonded area may include from about 5 to about 30 percent of the total area of the binder-containing bonded carded web. Thermal pattern bonding desirably is carried out prior to the application of binder. However, thermal pattern bonding also may be carried out after binder has been applied to the bonded carded web.

The present invention further provides a loop material suitable for use in a hook-and-loop fastening system. The loop material includes a first layer having a first side and a second side, and a second layer having a first side and a second side, with the first side of the second layer being bonded adjacent to and contiguous with the second side of the first layer.

The first layer is a bonded carded web which has a basis weight of from about 15 to about 140 grams per square meter and a thickness of from about 1 mm to about 15 mm. The bonded carded web is composed of fibers having a denier per filament greater than 2, with from 100 to 0 percent by weight of the fibers being thermoplastic polymer fibers and from 0 to 100 percent by weight of the fibers being bicomponent thermoplastic polymer fibers. The first component of the bicomponent thermoplastic polymer fibers has a melting point which is at least about 50° C. lower than the melting point of the second component.

The first layer bonded carded web has a plurality of interfiber bonds and contains a binder at a level of from about 10 to about 50 percent by weight, based on the weight of the bonded carded web, in which the amount of binder at the second side is less than the amount of binder at the first side and the amount of binder at the first side is sufficient to permit multiple attachments of the first side of the first layer to and releases from the hooks without significant distortion of the fibers at the first side. For example, the binder may be present in the first layer at a level of from about 25 to about 45 percent by weight, based on the weight of the first layer.

When the first layer includes bicomponent thermoplastic polymer fibers, the first layer may have a plurality of interfiber bonds formed between the first component of bicomponent thermoplastic polymer fibers and adjacent fibers. By way of illustration, the first layer may include from 100 to about 50 percent by weight of thermoplastic polymer fibers and from about 50 to 100 percent by weight of bicomponent thermoplastic polymer fibers. For example, essentially all of the fibers of the first layer may be bicomponent thermoplastic polymer fibers. As a further illustration, the bicomponent thermoplastic polymer fibers of the first layer may be sheath-core thermoplastic polymer fibers, with the sheath being composed of the first component. For example, the bicomponent thermoplastic polymer fibers of the first layer may be polyester fibers.

The second layer includes a nonwoven web composed of fibers having a denier per filament no greater than about 2 and a basis weight of at least about 15 grams per square meter, with from 100 to 0 percent by weight of the fibers being thermoplastic polymer fibers and from 0 to 100 percent by weight of the fibers being bicomponent thermoplastic polymer fibers. The first component of the bicomponent thermoplastic polymer fibers has a melting point which is at least about 50° C. lower than the melting point of the second component. In general, the nonwoven web may be a melt-extruded web or a nonwoven web prepared by, for example, wet-laying, air-laying, carding, and the like.

Desirably, the second layer will be a bonded carded web, in which from about 50 to 100 percent by weight of the fibers thereof are bicomponent thermoplastic polymer fibers and from about 50 to 0 percent of the fibers are thermoplastic polymer fibers. For example, the bicomponent thermoplastic polymer fibers of the second layer may be sheath-core thermoplastic polymer fibers, with the sheath being composed of the first component. As another example, the bicomponent thermoplastic polymer fibers may be polyester fibers.

In some embodiments, the bonded carded web may be thermally pattern bonded. For example, the thermally pattern bonded area may include from about 5 to about 30 percent of the total area of the bonded carded web.

In addition to the first and second layers as defined above, the loop material may include a coating of a thermoplastic polymer on the second side of the second layer, which coating is present at a level of from about 10 to about 70 percent by weight, based on the weight of the first and second layers. The loop material may further include a coating of an adhesive over the coating on the second side of the second layer and a coating of abrasive grains over and bonded by the coating of adhesive. The loop material may also include a coating of a polymer over the coating of abrasive grains.

The present invention still further provides a method of preparing a loop material suitable for use in a hook-and-loop fastening system. The method includes providing a first layer which is a carded web having a first side and a second side, in which the carded web has a basis weight of from about 15 to about 140 grams per square meter, a thickness of from about 1 mm to about 15 mm, and is composed of fibers, with from 100 to about 50 percent by weight of the fibers being thermoplastic polymer fibers and from about 50 to 100 percent by weight of the fibers being bicomponent thermoplastic polymer fibers having a denier per filament greater than 2, in which the first component has a melting point which is at least about 50° C. lower than the melting point of the second component.

A second layer having a first side and a second side then is provided. The second layer includes a carded web composed of fibers having a denier per filament no greater than about 2 and a basis weight of at least about 15 grams per square meter, with from about 50 to 0 percent of the fibers being thermoplastic polymer fibers and from about 50 to 100 percent by weight of the fibers being bicomponent thermoplastic polymer fibers, in which the first component has a melting point which is at least about 50° C. lower than the melting point of the second component.

The first side of the second layer is placed adjacent to and contiguous with the second side of the first layer. The first and second layers are through air bonded at a temperature sufficient to form a plurality of interfiber bonds between the first component of the bicomponent thermoplastic polymer fibers present in both layers and adjacent fibers in and between both layers.

A binder is applied to the first side of the first layer at a level of from about 10 to about 50 percent by weight, based on the weight of the first layer, under conditions sufficient to provide less binder at the second side than at the first side and an amount of binder at the first side which is sufficient to permit multiple attachments of the first side of the first layer to and releases from the hooks without significant distortion of the fibers at the first side. As an example, the binder may be present in the first layer at a level of from about 25 to about 45 percent by weight basis, based on the weight of the first layer.

In certain embodiments, essentially all of the fibers of the first layer will be bicomponent thermoplastic polymer fibers. For example, the bicomponent thermoplastic polymer fibers may be sheath-core thermoplastic polymer fibers, with the sheath being composed of the first component. As another example, the bicomponent thermoplastic polymer fibers may be polyester fibers.

The method may include thermally pattern bonding the loop material. For example, the thermally pattern bonded area may include from about 5 to about 30 percent of the total area of the loop material. The method also may include applying a layer of a thermoplastic polymer on the second side of the second layer, which layer is present at a level of from about 10 to about 70 percent by weight, based on the weight of the first and second layers. The method may further include applying a layer of an adhesive over the layer on the second side of the second layer and a layer of abrasive grains over the layer of adhesive under conditions sufficient to bond the adhesive grains to the layer on the second side of the second layer. A coating of a polymer may be applied over the layer of abrasive grains.

DETAILED DESCRIPTION OF THE INVENTION

Figure 1:
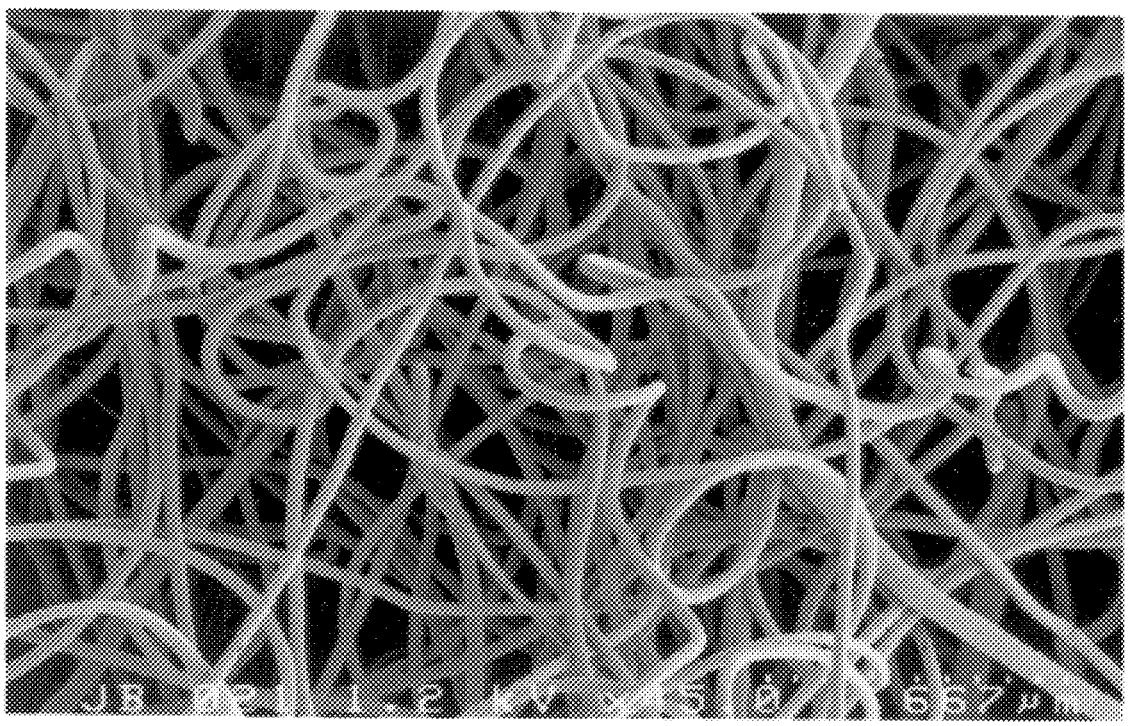
FIG. 1 is a plane view scanning electron micrograph taken at a magnification of 45× of a bonded carded web before being spray bonded in accordance with the present invention.

As used herein, the term "hook-and-loop fastening system" refers to any fastening system in which a first component includes a plurality of hooks (the hook component) and a second component includes a plurality of loops (the loop component). The hook component usually includes a plurality of semi-rigid, hook-shaped elements anchored or connected to a base material. The loop component generally includes a resilient material having a plurality of loops available at a surface thereof for engagement by the hook-shaped elements (hooks). The hooks of the first component are designed to engage the loops of the second component, thereby forming mechanical bonds between the hook and the loop elements of the two components. These mechanical bonds function to prevent separation of the respective components during normal use. These fastening systems are designed to avoid separation of the hook and loop components by application of a shear force or stress which is applied in a plane parallel to or defined by the connected surfaces of the hook and loop components, as well as by certain peel forces or stresses. However, application of a peeling force in a direction generally perpendicular or normal to the plane defined by the connected surfaces of the hook and loop components can cause separation of the hook elements from the loop elements. Separation typically is accomplished by bending a resilient component until the hook elements disengage the loop elements; either or both of the hook component and the loop component may be resilient, depending upon the application. The hook elements may have a variety of sizes, shapes, and orientations. Popular, commercially available examples of hook-and-loop fastening systems are those available under the Velcro® trademark.

The term "melt-extruded" as applied to a nonwoven web is meant to include a web prepared by any melt-extrusion process for forming a nonwoven web in which melt-extrusion to form fibers is followed concurrently by web formation on a foraminous support. The term includes, among others, such well-known processes as meltblowing, coforming, spunbonding, and the like. By way of illustration only, such processes are exemplified by the following references:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", Industrial and Engineeriinq Chemistry, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

The term "carded web" is used herein to mean a nonwoven web prepared from staple fibers which are usually purchased in bales. The bales are placed in a picker which separates the fibers. Next, the fibers are sent through a combing or carding unit which further breaks apart and aligns the staple fibers in the machine direction so as to form a machine direction-oriented fibrous nonwoven web. Once the web has been formed, it is then bonded by one or more of several bonding methods.

As used herein, the term "bonded carded web" means a carded web as described above, in which the fibers of which the web is composed have been bonded together to form a plurality of interfiber bonds.

The term "through air bonding" is used herein to mean a process of bonding a nonwoven bicomponent fiber web. The process involves winding the web at least partially around a screen-covered drum which is enclosed in a hood. Air which is sufficiently hot to melt one of the polymers of which the fibers of the web are made (e.g., the sheath polymer of the bicomponent thermoplastic polymer fibers) is forced from the hood, through the web and into the perforated roller. The air velocity may be, by way of example, between 100 and 500 feet per minute and the dwell time may be as long as 6 seconds. The melting and resolidification of the polymer provide the bonding.

The term "through air bonding" also includes the use of a hot air knife as described in commonly assigned U.S. patent application No. 08/362,328, filed on Dec. 22, 1994, which is incorporated herein by reference. Briefly, a hot air knife is a device which focuses a stream of heated air at a high linear flow rate onto a carded nonwoven web. For example, the linear flow rate of the stream of heated air may be in a range of from about 300 to about 3,000 meters per minute and the temperature of the stream may be in a range of from about 90° C. to about 290° C. Higher temperatures may be used, depending upon the melting point of the polymer employed as the first or sheath component in the bicomponent thermoplastic polymer fibers present in the web. The stream of heated air is arranged and directed by at least one slot which typically has a width of from about 3 to about 25 mm and is oriented in a substantially cross-machine direction over substantially the entire width of the web. A plurality of slots may be employed, if desired, and they may be arranged next to or separate from each other. The at least one slot may be continuous or discontinuous and may be composed of closely spaced holes. The hot air knife has a plenum to distribute and contain the heated air prior to exiting the slot. The plenum pressure of the air usually is from about 2 to about 22 mm Hg. The hot air knife typically is positioned from about 6 to about 254 mm above the surface of the carded web.

As used herein, the term "thermally pattern bonded" refers to pattern (or point) bonding by the application of heat and pressure. For example, the application of heat and pressure may be in the ranges of from about 80° C. to about 180° C. and from about 150 to about 1,000 pounds per linear inch (from about 59 to about 178 kg per cm), respectively, employing a pattern with from about 10 to about 250 bonds per square inch (from about 1 to about 40 bonds per square cm) covering from about 5 to about 30 percent of the nonwoven web surface area. Such pattern bonding is accomplished in accordance with known procedures. See, for example, U.S. Design Pat. No. 239,566 to Vogt, U.S. Design Pat. No. 264,512 to Rogers, U.S. Pat. Nos. 3,855,046 to Hansen et al., and 4,493,868 to Meitner for illustrations of bonding patterns and a discussion of bonding procedures.

The term "thermoplastic polymer" is used herein to mean a polymer that softens when exposed to heat and returns to its original condition when cooled to room temperature. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(e-caprolactam), poly(hexamethylene adipamide), poly(hexamethylene sebacamide), and poly(1 1-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenylene-isopropylidene-1,4-phenylene) and poly(sulfonyl-1,4-phenyleneoxy-1,4-phenylenesulfonyl-4,4'-biphenylene); polycarbonates, such as poly(bisphenol A) or poly(carbonyidioxy-1,4-phenyleneisopropylidene-1,4-phenylene); polyesters, such as poly(ethylene terephthalate), poly(tetramethylene terephthalate), and poly(cyclohexylene-1,4-dimethylene terephthalate) or poly(oxymethylene-1,4-cyclohexylenemethyleneoxyterephthaloyl); polyaryl sulfides, such as poly(phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystryrenes; copolymers of the foregoing, such as acrylonitrile-butadiene-styrene (ABS) copolymers; and the like.

As used herein, the term "bicomponent thermoplastic polymer fibers" refers to fibers which have been formed from at least two thermoplastic polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath-core arrangement wherein one polymer is surrounded by another or a side-by-side arrangement. Bicomponent fibers are taught in U.S. Pat. Nos. 5,108,820 to Kaneko et al., 5,336,552 to Strack et al., and European Pat. No. 0 586 924. The component polymers may be present in any desired ratio.

The term "denier per filament" is used herein to mean the denier of an individual staple fiber as if it were continuous. The term "denier" refers to the weight in grams of 9,000 meters of such a staple fiber. The term "tex" is a unit for expressing linear density, used primarily in Europe, and is equal to the weight in grams of 1 kilometer of the fiber.

The term "melting point" and variations thereof are used herein only in a qualitative sense and are not meant to refer to any particular test procedure. Reference herein to a melting point (temperature) or range is meant only to indicate an approximate temperature or range at which a polymer melts to an extent sufficient to form interfiber bonds.

Manufacturers' published data regarding the melt behavior of polymers correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM Test Method E-28, is useful in predicting their behavior in the present invention. Moreover, the melting points or softening points described are better indicators of performance in this invention than the chemical nature of the polymer.

The term "interfiber bonds" is used herein to mean the bonding of one fiber to another, adjacent fiber, typically at or near juncture points where one fiber meets or crosses another fiber. Bonding generally results from the film-forming characteristics of an adhesive or binder or from the melting of an adhesive or binder or a portion of either or both of the adjacent fibers.

As used herein, the term "binder" is meant to include any polymeric material which may be used to bind the fibers of a nonwoven web together. Such binder may be applied as either a solution of a polymer in a suitable solvent or as a dispersion of very small polymer particles in a liquid phase, such as water. By way of illustration only, the binder may be formulated as a latex. Desirably, the polymeric material in the latex will have a glass transition temperature ($T_g$) of from about −40° C. to about 40° C. More desirably, the polymeric material in the latex will have a glass transition temperature ($T_g$) of from about 0° C. to about 40° C. For example, the polymeric material may be an acrylic resin, a styrene-butadiene rubber, a vinyl-acrylic resin, or an ethylene-vinyl chloride resin.

As stated earlier, the present invention provides a loop material suitable for use in a hook-and-loop fastening system. The loop material includes a bonded carded web having a first side and a second side. The bonded carded web has a basis weight of from about 15 to about 140 grams per square meter and a thickness of from about 1 mm to about 15 mm. For example, the thickness of the bonded carded web may be in a range of from about 2 mm to about 10 mm. The bonded carded web may be thermally pattern bonded. For example, the thermally pattern bonded area may include from about 5 to about 30 percent of the total area of the bonded carded web.

The bonded carded web is composed of fibers having a denier per filament greater than 2, with from 100 to 0 percent by weight of the fibers being thermoplastic polymer fibers and from 0 to 100 percent by weight of the fibers being bicomponent thermoplastic polymer fibers. The first component of the bicomponent fibers has a melting point which is at least about 50° C. lower than the melting point of the second component. For example, the bonded carded web may be comprised of from about 50 to 0 percent by weight of thermoplastic polymer fibers and from about 50 to 100 percent by weight of bicomponent thermoplastic polymer fibers. As another example, essentially all of the fibers in the bonded carded web may be bicomponent thermoplastic polymer fibers. As still another example, the bicomponent thermoplastic polymer fibers may be sheath-core fibers, with the sheath being composed of the first component. For example, the bicomponent thermoplastic polymer fibers may be polyester fibers; that is, both components are polyesters having the required difference in melting points.

Both components of the bicomponent thermoplastic polymer fibers, however, do not need to be polyesters. That is, either or both of the components may be a thermoplastic polymer other than a polyester. By way of illustration only, Table A lists examples of sheath-core polymer combinations in which the first or sheath component or polymer has a melting point which is at least about 50° C. lower than the melting point of the second or core component. The selection of polymers in the table is based on equilibrium melting temperatures reported by L. Mandelkem and R. G. Alamo, "Thermodynamic Quantities Governing Melting," Chapter 11 in James E. Mark, "Physical Properties of Polymers Handbook," American Institute of Physics, 1996, pp.119–35. Accordingly, the actual melting behavior of polymers listed in the table may not correlate precisely with the values reported.

TABLE A

Examples of Sheath-Core Polymer Combinations

| Sheath | | Core | |
|---|---|---|---|
| Polymer | M.T.[a] | Polymer | M.T.[a] |
| Ethylene | 146 | isotactic-α-Propylene | 212 |
| isotactic-Butene-1 (I) | 136 | isotactic-β-Propylene | 192 |
| isotactic-Butene-1 | 136 | 4-methyl Pentene-1 | 250 |
| trans-1,4 Butadiene (I) | 96 | isotactic-Styrene | 243 |
| tetramethylene Isophthalate | 153 | tetramethylene Terephthalate | 230 |
| tetramethylene Terephthalate | 230 | ethylene Terephthalate | 340 |
| hexamethylene Terephthalate | 161 | ethylene Terephthalate | 340 |
| diethylene glycol Isophthalate | 100 | tetramethylene Isophthalate | 153 |
| decamethylene Azelamide | 214 | α,α' dimethyl Propiolactone | 269 |
| hexamethylene Terephthalate | 161 | α,α' diethyl Propiolactone | 258 |
| hexamethylene Terephthalate | 161 | Caprolactam | 229 |
| Vinylidene Chloride | 195 | Vinylidene Fluoride | 259 |
| Ester-amide 6-6[1] | 253 | 2,2'-bis 4,4'(oxyphenyl) Propane Carbonate | 317 |

[a]Equilibrium melting temperature in °C.

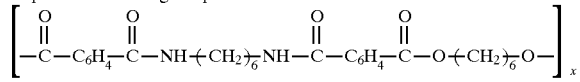

In addition, the bonded carded web has a plurality of interfiber bonds. By way of example, the fibers may be bonded by means of powder bonding, wherein a powdered adhesive is distributed through the web and then activated, usually by heating the web and adhesive with hot air. Another bonding method is pattern bonding wherein heated calendar rolls or ultrasonic bonding equipment are used to bond the fibers together, usually in a localized bond pattern, though the web can be bonded across its entire surface if so desired. A third method (referred to herein as through air bonding) involves the inclusion in the nonwoven web of bicomponent staple fibers; bonding is accomplished by utilizing a through air bonder or a hot air knife.

When the bonded carded web includes bicomponent thermoplastic polymer fibers, the web will have a plurality of interfiber bonds formed between the first component of bicomponent thermoplastic polymer fibers and adjacent fibers. The adjacent fibers may be thermoplastic polymer fibers, other bicomponent thermoplastic polymer fibers, or both. As the percentage of bicomponent fibers in the web increases, the number of interfiber bonds between adjacent bicomponent fibers also increases.

The web also contains a binder at a level of from about 10 to about 50 percent by weight, based on the weight of the bonded carded web, in which the amount of binder at the second side is less than the amount of binder at the first side and the amount of binder at the first side is sufficient to permit multiple attachments of the first side of the bonded carded web to and releases from the hooks without significant distortion of the fibers at the first side. For example, the binder may be present in the bonded carded web at a level of from about 25 to about 45 percent by weight, based on the weight of the bonded carded web. The binder, particularly at or near the first side of the bonded carded web, not only may increase the number of interfiber bonds, but also may reinforce existing interfiber bonds.

Figure 2:
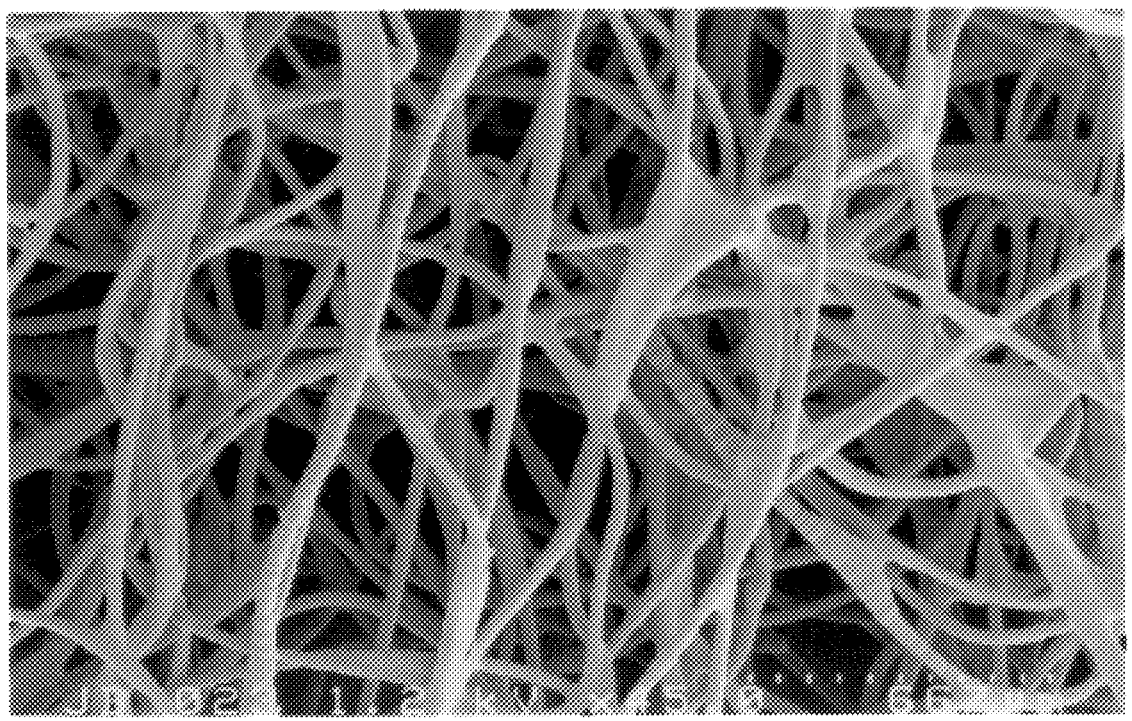
FIG. 2 is a plane view scanning electron micrograph taken at a magnification of 45× of a bonded carded web after being spray bonded in accordance with the present invention.

The foregoing requirement regarding the relative amounts of binder at the second and first sides is illustrated by FIGS. 1 and 2. FIG. 1 is a plane view scanning electron micrograph taken at a magnification of 45× of the first side of a bonded carded web before being spray bonded in accordance with the present invention. FIG. 2 is a plane view scanning electron micrograph taken at a magnification of 45× of the first side of a bonded carded web similar to that shown in FIG. 1 after being spray bonded in accordance with the present invention. It may be noted in FIG. 2 that the amount of binder at the first side of the web is sufficient to impart added strength and integrity to the fibers at or near the surface of the first side without significantly reducing the porosity of the web at the first side.

In general, the binder may be applied by any means known to those having ordinary skill in the art which will result in the above-described requirements. For example, the binder may be sprayed onto the first side of the bonded carded web.

The present invention also provides a method of preparing a loop material suitable for use in a hook-and-loop fastening system. The method includes providing a carded web having a first side and a second side. The carded web has a basis weight of from about 15 to about 140 grams per square meter and a thickness of from about 1 mm to about 15 mm. For example, the thickness of the bonded carded web may be in a range of from about 2 mm to about 10 mm. The carded web is composed of fibers having a denier per filament greater than 2, with from 100 to about 50 percent by weight of the fibers being thermoplastic polymer fibers and from about 50 to 100 percent by weight of the fibers being bicomponent thermoplastic polymer fibers. The first component has a melting point which is at least about 50° C. lower than the melting point of the second component.

The carded web is through air bonded at a temperature sufficient to form a plurality of interfiber bonds between the first component of the bicomponent thermoplastic polymer fibers and adjacent fibers. For example, through air bonding may be carried out at a temperature of from about 110° C. to about 190° C.

A binder then is applied to the resulting bonded carded web at a level of from about 10 to about 50 percent by weight, based on the weight of the bonded carded web, under conditions sufficient to provide less binder at the second side than at the first side and an amount of binder at the first side which is sufficient to permit multiple attachments of the first side of the bonded carded web to and releases from the hooks without significant distortion of the fibers at the first side. For example, the binder may be present in the bonded carded web at a level of from about 25 to about 45 percent by weight, based on the weight of the bonded carded web.

The binder is applied by spraying a latex binder onto the first side of the bonded carded web. For example, an airless system may be used, in which the binder is pumped through one or more spray nozzles. The binder typically is under a pressure of from about 250 to about 300 psi (from about 17 to about 21 kilograms per square centimeter), although lower or higher pressures may be employed, depending in part upon the design of the nozzles. The nozzles generally may be located from about 31 to about 51 cm above the surface of the web. The nozzles may have openings of from about 11 mils to about 43 mils (from about 0.3 to about 1.1 mm). Spray patterns usually are elliptical, but other patterns may be employed, if desired. The binder typically has a solids content of from about 15 to about 30 percent and a low viscosity, usually less than about 100 centipoise as determined by a Brookfield viscometer.

In certain embodiments, essentially all of the fibers will be bicomponent thermoplastic polymer fibers. By way of example, the bicomponent thermoplastic polymer fibers may sheath-core thermoplastic polymer fibers, with the sheath being composed of the first component. As another example, the bicomponent thermoplastic polymer fibers may be polyester fibers.

In some embodiments, the bonded carded web may be thermally pattern bonded. For example, the thermally pattern bonded area may include from about 5 to about 30 percent of the total area of the bonded carded web.

The present invention further provides a loop material suitable for use in a hook-and-loop fastening system. The loop material includes a first layer having a first side and a second side, and a second layer having a first side and a second side. The first layer is a bonded carded web which has a basis weight of from about 15 to about 140 grams per square meter and a thickness of from about 1 mm to about 15 mm. In addition, the bonded carded web is composed of fibers, with from 100 to 0 percent by weight of the fibers being thermoplastic polymer fibers and from 0 to 100 percent by weight of the fibers being bicomponent thermoplastic polymer fibers having a denier per filament greater than 2. The first component of the bicomponent thermoplastic polymer fibers has a melting point which is at least about 50° C. lower than the melting point of the second component. The bonded carded web has a plurality of interfiber bonds and contains a binder at a level of from about 10 to about 50 percent by weight, based on the weight of the bonded carded web, in which the amount of binder at the second side is less than the amount of binder at the first side and the amount of binder at the first side is sufficient to permit multiple attachments of the first side of the first layer to and releases from the hooks without significant distortion of the fibers at the first side. For example, the binder may be present in the first layer at a level of from about 25 to about 45 percent by weight, based on the weight of the first layer.

When the first layer includes bicomponent thermoplastic polymer fibers, the first layer may have a plurality of interfiber bonds formed between the first component of bicomponent thermoplastic polymer fibers and adjacent fibers. By way of illustration, the first layer may include from 100 to about 50 percent by weight of thermoplastic polymer fibers and from about 50 to 100 percent by weight of bicomponent thermoplastic polymer fibers. For example, essentially all of the fibers of the first layer may be bicomponent thermoplastic polymer fibers. As a further illustration, the bicomponent thermoplastic polymer fibers of the first layer may be sheath-core thermoplastic polymer fibers, with the sheath being composed of the first component. For example, the bicomponent thermoplastic polymer fibers of the first layer may be polyester fibers.

The second layer includes a nonwoven web composed of fibers having a denier per filament no greater than about 2 and a basis weight of at least about 15 grams per square meter, with the first side of the second layer being bonded adjacent to and contiguous with the second side of the first layer.

In some embodiments, the second layer may be a bonded carded web. For example, from about 50 to 100 percent by weight of the fibers of the second layer may be bicomponent thermoplastic polymer fibers, in which the first component has a melting point which is at least about 50° C. lower than the melting point of the second component. As another example, the bicomponent thermoplastic polymer fibers of the second layer may be sheath-core thermoplastic polymer fibers, with the sheath being composed of the first component. As still another example, the bicomponent thermoplastic polymer fibers may be polyester fibers.

In some embodiments, the loop material may be thermally pattern bonded. For example, the thermally pattern bonded area may include from about 5 to about 30 percent of the total area of the bonded carded web.

In addition to the first and second layers as defined above, the loop material may include a coating of a thermoplastic polymer on the second side of the second layer, which coating is present at a level of from about 10 to about 70 percent by weight, based on the weight of the first and second layers. The loop material may further include a coating of an adhesive over the coating on the second side of the second layer and a coating of abrasive grains over and bonded by the coating of adhesive. The loop material may also include a coating of a polymer over the coating of abrasive grains.

The present invention still further provides a method of preparing a loop material suitable for use in a hook-and-loop fastening system. The method includes providing a first layer which is a carded web having a first side and a second side, in which the carded web has a basis weight of from about 15 to about 140 grams per square meter, a thickness of from about 1 mm to about 15 mm, and is composed of fibers having a denier per filament greater than 2, with from 100 to about 50 percent by weight of the fibers being thermoplastic polymer fibers and from about 50 to 100 percent by weight of the fibers being bicomponent thermoplastic polymer fibers, in which the first component has a melting point which is at least about 50° C. lower than the melting point of the second component.

A second layer having a first side and a second side then is provided. The second layer includes a carded web composed of fibers having a denier per filament no greater than about 2 and a basis weight of at least about 15 grams per square meter, with from about 50 to 100 percent by weight of the fibers being bicomponent thermoplastic polymer fibers, in which the first component has a melting point which is at least about 50° C. lower than the melting point of the second component.

The first side of the second layer is placed adjacent to and contiguous with the second side of the first layer. The first and second layers are through air bonded at a temperature sufficient to form a plurality of interfiber bonds between the first component of the bicomponent thermoplastic polymer fibers present in both layers and adjacent fibers in and between both layers. A binder is applied to the first side of the first layer at a level of from about 10 to about 50 percent by weight, based on the weight of the first layer, under conditions sufficient to provide less binder at the second side than at the first side and an amount of binder at the first side which is sufficient to permit multiple attachments of the first side of the first layer to and releases from the hooks without significant distortion of the fibers at the first side. As an example, the binder may be present in the first layer at a level of from about 25 to about 45 percent by weight basis, based on the weight of the first layer.

In certain embodiments, essentially all of the fibers of the first layer are bicomponent thermoplastic polymer fibers. For example, the bicomponent thermoplastic polymer fibers may be sheath-core thermoplastic polymer fibers, with the sheath being composed of the first component. As another example, the bicomponent thermoplastic polymer fibers may be polyester fibers.

The method may include thermally pattern bonding the loop material. For example, the thermally pattern bonded area may include from about 5 to about 30 percent of the total area of the loop material. The method also may include applying a layer of a thermoplastic polymer on the second side of the second layer, which layer is present at a level of from about 10 to about 70 percent by weight, based on the weight of the first and second layers. The method may further include applying a layer of an adhesive over the layer on the second side of the second layer and a layer of abrasive grains over the layer of adhesive under conditions sufficient to bond the adhesive grains to the layer on the second side of the second layer. A coating of a polymer may be applied over the layer of abrasive grains.

The present invention is further described by the examples which follow. Such examples, however, are not to be construed as limiting in any way either the spirit or the scope of the present invention.

EXAMPLES 1–46

These examples utilized already prepared nonwoven webs in order to evaluate spray bonding conditions. Spray bonding was carried out on pilot plant equipment. The equipment consisted of a stationary spray nozzle located above a horizontally traversing sample holder driven by a hydraulic ram. The spray nozzle could be moved up and down (vertically) from about 12 to about 18 inches (about 30 cm to about 46 cm) from the sample holder. The spray nozzle could be changed to alter the size of the orifice and the spray pressure also could be adjusted. The spray nozzle was designed to emit a cone-shaped spray. The angular distance in degrees from one point on the surface of the cone to a point on the surface of the cone directly opposite was designated as the spray angle.

The sample holder moved under the nozzle as spray was emitted and returned to the start position after the spray stopped. The speed of the sample holder was adjustable by altering the pressure of the hydraulic ram. However, no attempt was made to measure the linear velocity of the sample holder; speed was simply recorded as the pressure setting for the ram. The unit was essentially a deep sink with a tray on either side. The sample holder traversed from one tray, across the sink to the other tray, and then returned to its starting position. The spray nozzle was above the sink and covered on the top and the sides opposite the trays. Spraying took place over the sink.

Several different webs were spray bonded with two different binders as described above. Webs A, B, and C had been through air bonded. The webs and binders are identified below.

Web A

This web was a bonded carded web consisting of 60 percent by weight of bicomponent thermoplastic polymer fibers having a denier per filament of 12 and 40 percent by weight of thermoplastic polymer fibers having a denier per filament of 6. The bicomponent fibers were Celbond™ Type 254 copolyester fibers having a copolyester sheath and a polyester core (Hoechst Celanese, Charlotte, N.C.). The sheath polymer had a melting point of 110° C. The thermoplastic polymer fibers were Trevira™ Type 295 polyester fibers (Hoechst Celanese). The web had a basis weight of 51 grams per square meter (gsm).

Web B

Web B also was a bonded carded web; it had a basis weight of 20 gsm and consisted of 3.3 denier per filament bicomponent thermoplastic polymer fibers. The sheath polymer was polyethylene having a melting point of 128° C.; the core polymer was a polyester.

Web C

Web C was a 10 denier per filament version of Web B.

Web D

This web was spunbonded web having a basis weight of 51 gsm. The spunbonded fibers were side-by-side polyethylene-polypropylene bicomponent fibers. The web had been thermally pattern bonded.

Binder A

Binder A was a self-crosslinking acrylic latex (Rhoplex® TR-407, Rohm & Haas Company, Philadelphia, Pa.). The latex had a solids content of 46 percent by weight and the polymer had a $T_g$ of 34° C. The latex contained an anionic stabilizer.

Binder B

This binder also was an acrylic latex (Rhoplex® HA-16, Rohm & Haas Company). It was a self-crosslinking acrylic emulsion containing a nonionic stabilizer; the polymer had a $T_g$ of 33° C.

The spray bonding variables which were studied were the nozzle size, spray angle, spray pressure, and the number of passes of a web through the spray. The distance of the nozzles from the web was about 25 cm. The web, binder, and spray bonding variables are summarized in Table 1.

TABLE 1

Spray Bonding Conditions for Various Nonwoven Webs

| Ex. | Web | Binder | Nozzle Size[a] | Spray Angle[b] | Spray Press.[c] | Traverse Press.[c] | No. Passes |
|---|---|---|---|---|---|---|---|
| 1 | A | A | 26 | 110 | 270 | 18 | 2 |
| 2 | A | A | 26 | 110 | 270 | 18 | 3 |
| 3 | A | A | 26 | 110 | 270 | 18 | 4 |
| 4 | A | A | 15 | 95 | 270 | 18 | 2 |
| 5 | A | A | 15 | 95 | 270 | 18 | 3 |
| 6 | A | A | 36 | 110 | 270 | 18 | 2 |
| 7 | A | A | 36 | 110 | 270 | 18 | 3 |
| 8 | A | A | 53 | 110 | 270 | 18 | 1 |
| 9 | A | A | 18 | 80 | 270 | 18 | 3 |
| 10 | A | A | 18 | 80 | 270 | 18 | 4 |
| 11 | A | A | 26 | 110 | 200 | 18 | 3 |
| 12 | A | A | 26 | 110 | 150 | 18 | 4 |
| 13 | A | A | 26 | 110 | 100 | 18 | 4 |
| 14 | A | A | 36 | 110 | 150 | 18 | 2 |
| 15 | A | A | 53 | 110 | 150 | 18 | 1 |
| 16 | A | A | 18 | 80 | 150 | 18 | 4 |
| 17 | A | A | 11 | 65 | 150 | 18 | 4 |
| 18 | A | A | 43 | 110 | 150 | 18 | 2 |
| 19 | A | B | 26 | 110 | 150 | 18 | 4 |
| 20 | A | B | 26 | 110 | 270 | 18 | 3 |
| 21 | A | A | 26 | 110 | 270 | 18 | 4 |
| 22 | A | A | 26 | 110 | 270 | 18 | 4 |
| 23 | A | A | 26 | 110 | 270 | 18 | 3 |
| 24 | A | A | 26 | 110 | 270 | 18 | 3 |
| 25 | A | A | 43 | 110 | 270 | 18 | 2 |
| 26 | A | A | 43 | 110 | 150 | 18 | 2 |
| 27 | A | A | 43 | 110 | 150 | 18 | 2 |
| 28 | A | A | 43 | 110 | 150 | 18 | 2 |
| 29 | A | A | 43 | 110 | 150 | 18 | 2 |
| 30 | B | A | 26 | 110 | 150 | 18 | 1 |
| 31 | B | A | 26 | 110 | 150 | 18 | 2 |
| 32 | B | A | 26 | 110 | 150 | 18 | 2 |
| 33 | B | A | 26 | 110 | 150 | 18 | 2 |
| 34 | B | A | 26 | 110 | 150 | 18 | 3 |
| 35 | B | N/A[d] | N/A | N/A | N/A | N/A | N/A |
| 36 | C | A | 26 | 110 | 150 | 18 | 1 |
| 37 | C | A | 26 | 110 | 150 | 18 | 2 |
| 38 | C | A | 26 | 110 | 150 | 18 | 3 |
| 39 | C | A | 26 | 110 | 150 | 18 | 4 |
| 40 | C | A | 26 | 110 | 150 | 18 | 4 |
| 41 | D | N/A | N/A | N/A | N/A | N/A | N/A |
| 42 | D | A | 26 | 110 | 270 | 18 | 2 |
| 43 | D | A | 26 | 110 | 270 | 18 | 3 |
| 44 | D | A | 26 | 110 | 270 | 18 | 3 |
| 45 | D | A | 26 | 110 | 150 | 18 | 3 |
| 46 | D | A | 26 | 110 | 150 | 18 | 4 |

[a]Diameter of the orifice in the nozzle, in mils (to convert to mm, multiply by 0.0254).
[b]Angle of the widest portion of the spray pattern.
[c]In pounds per square inch (psi) (to convert to newtons per square meter, multiply by $0.0689 \times 10^5$).
[d]Not applicable.

The utility of the various spray bonded webs as a loop material in a hook-and-fastening system was qualitatively evaluated by attaching and removing each and from a standard circular hook disc pad having mushroom-type hooks (3M Automotive Quick Change Disc Pad) having a diameter of about 5 inches (about 12.4 cm). Peel strength was estimated by attaching a sprayed nonwoven web to the disk an then pulling the web from hooks, starting at one edge and continuing until the web was completely removed from the pad. Binder add-on and test results are summarized in Table 2.

TABLE 2

Binder Add-on and Test Results

| Ex. | Initial Weight, g | Final Weight, g | Percent Add-on | Comments |
|---|---|---|---|---|
| 1 | 6.49 | 7.76 | 19.5 | Fair |
| 2 | 6.42 | 8.52 | 32.7 | Fair |
| 3 | 6.43 | 9.23 | 43.5 | Good |
| 4 | 6.40 | 7.31 | 14.2 | Not tested (non-uniform coverage on edges |
| 5 | 6.47 | 7.84 | 21.2 | Not tested (non-uniform coverage on edges) |
| 6 | 6.55 | 9.41 | 43.7 | Poor |
| 7 | 6.54 | 11.08 | 68.8 | Poor |
| 8 | 6.64 | 8.56 | 30.8 | Fair (better than Examples 6 and 7 but worse than Example 3) |
| 9 | 6.43 | 8.18 | 27.2 | Poor |
| 10 | 6.37 | 8.78 | 37.8 | Poor |
| 11 | 6.30 | 8.15 | 29.4 | Good (better than Example 2) |
| 12 | 6.26 | 8.46 | 35.1 | Good (close to Example 3) |
| 13 | 6.57 | 8.57 | 30.7 | Fair (not as good as Examples 11 and 12) |
| 14 | 6.40 | 8.47 | 32.3 | Fair |
| 15 | 6.18 | 7.69 | 24.4 | Fair |
| 16 | 6.17 | 8.09 | 31.1 | Fair |
| 17 | 6.13 | 7.02 | 14.5 | Fair |
| 18 | 6.24 | 9.06 | 45.2 | Good (close to Example 3) |
| 19 | 6.50 | 9.10 | 40.0 | Poor |
| 20 | 6.47 | 9.13 | 41.1 | Poor |
| 21 | 6.44 | 9.99 | 55.0 | Good |

TABLE 2-continued

Binder Add-on and Test Results

| Ex. | Initial Weight, g | Final Weight, g | Percent Add-on | Comments |
|---|---|---|---|---|
| 22 | 6.42 | 10.13 | 57.8 | Good |
| 23 | 6.45 | 9.26 | 43.5 | Good |
| 24 | 6.46 | 9.12 | 41.2 | Good (better than Examples 21–23) |
| 25 | 6.58 | 10.77 | 63.7 | Good |
| 26 | 6.53 | 9.56 | 46.4 | Poor (weak) |
| 27 | 6.43 | 8.93 | 38.9 | Good |
| 28 | 6.36 | 10.63 | 67.1 | Good |
| 29 | 6.46 | 9.39 | 45.4 | Good (slightly better than Examples 28 and 29) |
| 30 | 0.97 | 1.19 | 22.7 | Good |
| 31 | 1.04 | 1.51 | 45.1 | Poor (weak) |
| 32 | 0.93 | 1.29 | 38.7 | Good |
| 33 | 1.01 | 1.43 | 41.5 | Poor (weak) |
| 34 | 1.07 | 1.72 | 60.7 | Poor (weak) |
| 35 | N/A[a] | N/A | N/A | Good (strong) |
| 36 | 1.48 | 1.59 | 7.4 | Poor (weak) |
| 37 | 1.50 | 1.87 | 24.7 | Good |
| 38 | 1.50 | 2.00 | 33.3 | Good |
| 39 | 1.36 | 2.03 | 49.0 | Good |
| 40 | 1.33 | 1.98 | 48.9 | Good (strongest sprayed Web C example) |
| 41 | N/A | N/A | N/A | Strong |
| 42 | 2.10 | 2.68 | 27.6 | Poor (weak) |
| 43 | 2.13 | 3.09 | 45.5 | Poor (no bonding) |
| 44 | 2.12 | 2.86 | 34.4 | Poor (no bonding) |
| 45 | 2.09 | 2.65 | 26.8 | Poor (slight bonding) |
| 46 | 2.12 | 2.85 | 34.4 | Poor (slight bonding) |

[a]Not applicable.

As Table 2 shows, Binder A was found to be a good bonding agent for the nonwoven webs examined. Binder B, however, gave less satisfactory results. While Examples 1 and 2 resulted in better peel strength than unsprayed web, even though unsprayed webs exhibited good shear strengths, Example 3 gave the best peel strength. Moreover, Example 18 was the closest to Example 3 in improvement of peel strength. Accordingly, a 26-mil nozzle at 270 psi spray pressure with 4 passes for a 43.5 percent add-on was determined to provide the best results. A 43-mil nozzle at 150 psi spray pressure and 2 passes for a 45.2 percent add-on was a very close second. All of the Web D examples showed some loss of peel strength upon being spray bonded.

EXAMPLES 46–58

The procedures of Examples 1–46 were repeated with various loop materials in an effort to optimize both peel strength and fiber pull. Four different types of loop materials were studied (the basis weights of all fibrous layers were before spray bonding):

Type I

Type I consisted of a first layer and a second layer, each of which had a first side and a second side. The first layer was a bonded carded web consisting of bicomponent thermoplastic polymer fibers having a denier per filament of 12. The bicomponent fibers were the Celbond™ Type 254 copolyester fibers described in Examples 1–47. The first layer had a basis weight of 34 gsm. The second layer also was a bonded carded web prepared from the same type of bicomponent thermoplastic polymer fibers; in this case, however, the fibers had a denier per filament of 2. The basis weight of the second layer was 34 gsm. The second layer was included in part to provide a relatively smooth and more dense surface to which a coating may be applied for subsequent make coat and grit application.

Carded first and second layers were placed together to form a two-layered loop material; the first side of the second layer was adjacent to and contiguous with the second side of the first layer. The material then was through air bonded and optionally thermally point bonded. One material also was spray bonded and another material was extrusion coated with a high density polyethylene on the second side of the second layer. The thickness of the extrusion coating was 0.5 mil (about 0.013 mm).

Type II

This type was similar to Type I, except that the first layer was a 34-gsm version of Web A in Examples 1–29 and the second layer had a basis weight of 17 gsm, rather than 34 gsm. Two materials were prepared, one of which was not thermally point bonded. Both materials were spray bonded and laminated to a film as described for the Type I loop materials.

Type III

The Type III loop materials consisted of 2 denier per filament versions of the first layer of the Type I loop materials. The Type III materials had a basis weight of 68 gsm. Two of the three materials prepared were thermally point bonded and/or spray bonded, while only one material was laminated to the polyethylene film.

Type IV

This type of loop materials consisted of 68 gsm versions of the first layer of the Type I loop materials. Two of the three materials were thermally point bonded, but all three were spray bonded and laminated to the polyethylene film.

Summaries of the various loop materials and test results are presented in Table 3.

TABLE 3

Summary of Loop Materials and Test Results

| Ex. | Mat'l Type | TAB Temp.[a] | TB[b] | Spray Bonding[c] | Extrusion Coating | Peel Strength | Fiber Pull |
|---|---|---|---|---|---|---|---|
| 47 | I | 138 | No | 40 | No | Low | — |
| 48 | I | 138 | Yes[d] | 0 | Yes | Low | Slight |
| 49 | I | 138 | Yes[e] | 0 | No | Low | — |
| 50 | I | 138 | Yes[f] | 0 | No | Low | — |
| 51 | II | 146 | No | 39 | Yes | Good | Yes |
| 52 | II | 146 | Yes[d] | 41 | Yes | Better | Yes |
| 53 | III | 132 | No | 40 | Yes | Low | Yes |
| 54 | III | 132 | Yes[d] | 40 | No | Low | — |
| 55 | III | 132 | Yes[g] | No | No | Low | — |
| 56 | IV | 132 | No | 27 | Yes | Best | No |
| 57 | IV | 132 | Yes[d] | 6 | Yes | Good | Yes |
| 58 | IV | 132 | Yes[g] | 6 | Yes | Good | Yes |

[a]Through air bonding temperature in °C.
[b]Thermal pattern bonding.
[c]Spray bonding add-on, in weight percent (a zero means the loop material was not spray bonded).
[d]Pattern roll temperature was 104° C., anvil roll temperature was 106° C., and the nip pressure was 20 psi (to convert to newtons per square meter, multiply by 0.0689 × 10⁵).
[e]Pattern roll temperature was 104° C., anvil roll temperature was 106° C., and the nip pressure was 35 psi (to convert to newtons per square meter, multiply by 0.0689 × 10⁵).
[f]Pattern roll temperature was 133° C., anvil roll temperature was 138° C., and the nip pressure was 30 psi (to convert to newtons per square meter, multiply by 0.0689 × 10⁵).
[g]Pattern roll temperature was 127° C., anvil roll temperature was 138° C., and the nip pressure was 30 psi (to convert to newtons per square meter, multiply by 0.0689 × 10⁵).

Type I loop materials did not provide sufficient peel strength. Further treatment, such as thermal bonding, densified the material and this resulted in further loss of peel strength. A second layer provided a smoother and less porous surface which is preferred for coating. The Type II loop materials, which combined bonding and nonbonding fibers in the first layer demonstrated good peel strength. However, because of the presence of nonbonding fibers, fiber pull was evident which was not acceptable. The Type III materials, on the other hand, lacked sufficient peel strength. It appeared that the number of fibers per unit area was sufficiently great so as to hamper hook engagement to the loop material. Further, thermal bonding and spray bonding of the latex collapse the material, thereby reducing the peel strength, presumably because the increased density of the collapsed structure hampered hook engagement. Finally, the Type IV loop materials demonstrated the highest peel strengths and, with air bonding and spray bonding, fiber pull was minimized.

The lamination of a polyethylene film to a loop material may improve peel strength, depending upon the material. It was observed that spray bonding desirably was carried out prior to applying the film. If the loop material was laminated before spray bonding, the sprayed binder tended to simply form a film over portions of the first surface of the first layer, thereby significantly reducing hook attachment.

EXAMPLES 59–65

Based on the results obtained in Examples 47–58, additional studies were carried out with the Type IV loop material. In every case, spray bonding add-on was 50 percent by weight of Binder A. Basis weight and through air bonding temperatures were varied. The loop materials were evaluated as described in the preceding examples and then ranked, with the best being one and the worst being seven. The Table 4.

TABLE 4

Summary of Results with Type IV Loop Materials

| Ex. | Basis Weight[a] | TAB[b] Temp., °C. | Ranking |
|---|---|---|---|
| 59 | 68 | 149 | 7 |
| 60 | 81 | 135 | 6 |
| 61 | 81 | 141 | 4 |
| 62 | 81 | 149 | 2 |
| 63 | 95 | 135 | 5 |
| 64 | 95 | 141 | 3 |
| 65 | 95 | 149 | 1 |

[a]In gsm.
[b]Through air bonding.

The data in Table 4 suggest that peel strength and fiber pull increase with increases in basis weight and the through air bonding temperature, with the latter appearing to be the more significant variable at basis weights greater than 68 gsm.

EXAMPLES 66–75

The procedures described in the preceding examples were repeated in order to evaluate a number of two-layered loop materials which are summarized in Table 5. In the table, all 2 and 12 denier per filament fibers were the Type 254 bicomponent thermoplastic polymer fibers described in Examples 1–46 and the 0.9 denier per filament fibers were Trevira® Type L70 polyester fibers (Hoechst Celanese).

TABLE 5

Summary of Two-layered Loop Materials

| Loop Material | First Layer Denier[a] | First Layer Basis Wt.[b] | Second Layer Denier[a] | Second Layer Basis Wt.[b] |
|---|---|---|---|---|
| A | 12 | 68 | 2 | 34 |
| B | 12 | 68 | 2 | 51 |
| C | 12 | 85 | 2 | 68 |
| D | 12 | 85 | 2 | 51 |
| E | 12 | 68 | 70% 2 30% 0.9 | 51 |

[a]Denier per filament.
[b]Basis weight in gsm.

All of the loop materials summarized in Table 5 were sprayed with Binder A as described previously. Samples of the loop materials then were coated by means of a No. 24 Meyer rod on the second side of the second layer with either Coating A or Coating B, each of which was an aqueous dispersion as summarized in Tables 6 and 7, respectively. In the tables, "Parts" means parts by weight.

TABLE 6

Summary of Coating A

| Ingredient Description | Code | Parts |
|---|---|---|
| Formaldehyde-free, non-self-crosslinking, acrylic latex with an anionic stabilizer; the polymer had a $T_g$ of 34° C. (Rohm & Haas Company) | AC-3001 | 300 |
| DEFO 2020E-50, an organo-siloxane (Ultra Additives) | DEFO | 0.3 |
| A swellable, crosslinked acrylic copolymer emulsion, Acrysol ASE-60 (Rohm & Haas Company) | ASE-60 | 6 |
| A non-crosslinked, alkali-soluble acrylic copolymer emulsion, Acrysol ASE-95 (Rohm & Haas Company) | ASE-95 | 4 |
| Water | N/A | 10 |
| Ammonia | N/A | 4.5 |

TABLE 7

Summary of Coating B

| Ingredient Description | Code | Parts |
|---|---|---|
| Formaldehyde-free, non-self-crosslinking, acrylic latex; the polymer had a $T_g$ of −6° C. | NW-1715 | 850 |
| DEFO 2020E-50, an organo-siloxane (Ultra Additives) | DEFO | 0.6 |
| A swellable, crosslinked acrylic copolymer emulsion, Acrysol ASE-60 (Rohm & Haas Company) | ASE-60 | 9 |
| A non-crosslinked, alkali-soluble acrylic copolymer emulsion, Acrysol ASE-95 (Rohm & Haas Company) | ASE-95 | 6 |
| Water | N/A | 15 |
| Ammonia | N/A | 8 |

Coating A had a viscosity of 70,000 cps and a pH of 9.5 and Coating B had a viscosity of 83,000 cps and a pH of 8.0. The viscosity measurements were made with a Brookfield Viscometer using a No. 4 spindle rotating at 6 rpm.

The resulting sprayed and coated loop materials are summarized in Table 8.

TABLE 8

Summary of Sprayed and Coated Loop Materials

| Ex. | Material Code | Sprayed Material | | | Coating | |
|---|---|---|---|---|---|---|
| | | Initial BW[a] | Final BW[a] | % Add-on | Code | BW[a] |
| 66 | A | 102 | 128 | 25 | A | 119 |
| 67 | A | 102 | 133 | 30 | B | 134 |
| 68 | B | 119 | 151 | 27 | A | 121 |
| 69 | B | 119 | 151 | 27 | B | 137 |
| 70 | C | 119 | 143 | 20 | A | 122 |
| 71 | C | 119 | 142 | 19 | B | 140 |
| 72 | D | 136 | 164 | 21 | A | 158 |
| 73 | D | 136 | 159 | 17 | B | 128 |
| 74 | E | 119 | 158 | 33 | A | 90 |
| 75 | E | 119 | 155 | 30 | B | 141 |

[a]Basis weight in gsm.

Each of the two-layered loop materials exhibited satisfactory shear and peel strengths.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A loop material suitable for use in a hook-and-loop fastening system, the loop material comprising a bonded carded web having a first side and a second side; wherein the bonded carded web:

has a basis weight of from about 15 to about 140 grams per square meter and a thickness of from about 1 mm to about 15 mm;

is comprised of fibers having a denier per filament greater than 2, with from 100 to 0 percent by weight of the fibers being thermoplastic polymer fibers and from 0 to 100 percent by weight of the fibers being bicomponent thermoplastic polymer fibers, in which the first component has a melting point which is at least about 50° C. lower than the melting point of the second component;

has a plurality of interfiber bonds; and contains a binder at a level of from about 10 to about 50 percent by weight, based on the weight of the bonded carded web, in which the amount of binder at the second side is less than the amount of binder at the first side and the amount of binder at the first side is sufficient to permit multiple attachments of the first side of the first layer to and releases from the hooks without significant distortion of the fibers at the first side.

2. The loop material of claim 1, in which the bonded carded web is comprised of from 100 to about 50 percent by weight of thermoplastic polymer fibers and from about 50 to 100 percent by weight of bicomponent thermoplastic polymer fibers.

3. The loop material of claim 2, in which the bonded carded web has a plurality of interfiber bonds formed between the first component of bicomponent thermoplastic polymer fibers and adjacent fibers.

4. The loop material of claim 2, in which essentially all of the fibers are bicomponent thermoplastic polymer fibers.

5. The loop material of claim 2, in which the bicomponent thermoplastic polymer fibers are sheath-core thermoplastic polymer fibers, with the sheath being comprised of the first component.

6. The loop material of claim 2, in which the bicomponent thermoplastic polymer fibers are polyester fibers.

7. The loop material of claim 1, in which the binder is present in the bonded carded web at a level of from about 25 to about 45 percent by weight, based on the weight of the bonded carded web.

8. The loop material of claim 1, in which the bonded carded web has been thermally pattern bonded.

9. The loop material of claim 8, in which the thermally pattern bonded area comprises from about 5 to about 30 percent of the total area of the bonded carded web.

10. A method of preparing a loop material suitable for use in a hook-and- loop fastening system, the method comprising:

providing a carded web having a first side and a second side, wherein the carded web:

has a basis weight of from about 15 to about 140 grams per square meter and a thickness of from about 1 mm to about 15 mm; and is comprised of fibers having a denier per filament greater than 2, with from 100 to about 50 percent by weight of the fibers being thermoplastic polymer fibers and from about 50 to 100 percent by weight of the fibers being bicomponent thermoplastic polymer fibers, in which the first component has a melting point which is at least about 50° C. lower than the melting point of the second component;

through air bonding the carded web at a temperature sufficient to form a plurality of interfiber bonds between the first component of the bicomponent thermoplastic polymer fibers and adjacent fibers; and applying a binder to the bonded carded web at a level of from about 10 to about 50 percent by weight, based on the weight of the bonded carded web, under conditions sufficient to provide less latex binder at the second side than at the first side and an amount of binder at the first side which is sufficient to permit multiple attachments of the first side of the first layer to and releases from the hooks without significant distortion of the fibers at the first side.

11. The method of claim 10, in which essentially all of the fibers are bicomponent thermoplastic polymer fibers.

12. The method of claim 10, in which the bicomponent thermoplastic polymer fibers are sheath-core thermoplastic polymer fibers, with the sheath being comprised of the first component.

13. The method of claim 10, in which the bicomponent thermoplastic polymer fibers are polyester fibers.

14. The method of claim 10, in which the binder is present in the bonded carded web at a level of from about 25 to about 45 percent by weight, based on the weight of the bonded carded web.

15. The method of claim 10, which further comprises thermally pattern bonding the bonded carded web.

16. The method of claim 15, in which the thermally pattern bonded area comprises from about 5 to about 30 percent of the total area of the bonded carded web.

17. A loop material suitable for use in a hook-and-loop fastening system, the loop material comprising a first layer having a first side and a second side, and a second layer having a first side and a second side;

wherein:

the first layer is a bonded carded web which:

has a basis weight of from about 15 to about 140 grams per square meter and a thickness of from about 1 mm to about 15 mm;

is comprised of fibers having a denier per filament greater than 2, with from 100 to 0 percent by weight of the fibers being thermoplastic polymer fibers and from 0 to 100 percent by weight of the fibers being bicomponent thermoplastic polymer fibers, in which the first component has a melting point which is at least about 50° C. lower than the melting point of the second component;

has a plurality of interfiber bonds; and contains a binder at a level of from about 10 to about 50 percent by weight, based on the weight of the bonded carded web, in which the amount of binder at the second side is less than the amount of binder at the first side and the amount of binder at the first side is sufficient to permit multiple attachments of the first side of the first layer to and releases from the hooks without significant distortion of the fibers at the first side; and the second layer comprises a nonwoven web comprised of fibers having a denier per filament no greater than about 2 and a basis weight of at least about 15 grams per square meter, with the first side of the second layer being bonded adjacent to and contiguous with the second side of the first layer.

18. The loop material of claim 17, in which the first layer is comprised of from 100 to about 50 percent by weight of thermoplastic polymer fibers and from about 50 to 100 percent by weight of bicomponent thermoplastic polymer fibers.

19. The loop material of claim 18, in which the bonded carded web has a plurality of interfiber bonds formed between the first component of bicomponent thermoplastic polymer fibers and adjacent fibers.

20. The loop material of claim 17, in which essentially all of the fibers of the first layer are bicomponent thermoplastic polymer fibers.

21. The loop material of claim 18, in which the bicomponent thermoplastic polymer fibers of the first layer are sheath-core thermoplastic polymer fibers, with the sheath being comprised of the first component.

22. The loop material of claim 18, in which the bicomponent thermoplastic polymer fibers of the first layer are polyester fibers.

23. The loop material of claim 17, in which the binder is present in the first layer at a level of from about 25 to about 45 percent by weight, based on the weight of the first layer.

24. The loop material of claim 17, in which the second layer is a bonded carded web.

25. The loop material of claim 24, in which from about 50 to 100 percent by weight of the fibers of the second layer are bicomponent thermoplastic polymer fibers, in which the first component has a melting point which is at least about 50° C. lower than the melting point of the second component.

26. The loop material of claim 25, in which the bicomponent thermoplastic polymer fibers of the second layer are sheath-core thermoplastic polymer fibers, with the sheath being comprised of the first component.

27. The loop material of claim 25, in which the bicomponent thermoplastic polymer fibers are polyester fibers.

28. The loop material of claim 17, in which the loop material has been thermally pattern bonded.

29. The loop material of claim 28, in which the thermally pattern bonded area comprises from about 5 to about 30 percent of the total area of the loop material.

30. The loop material of claim 17 which further comprises a coating of a thermoplastic polymer on the second side of the second layer, which coating is present at a level of from about 10 to about 70 percent by weight, based on the weight of the first and second layers.

31. The loop material of claim 30 which further comprises a coating of an adhesive over the coating on the second side of the second layer and a coating of abrasive grains over and bonded by the coating of adhesive.

32. The loop material of claim 31 which further comprises a coating of a polymer over the coating of abrasive grains.

33. A method of preparing a loop material suitable for use in a hook-and-loop fastening system, the method comprising:

providing a first layer which is a carded web having a first side and a second side, wherein the carded web:

has a basis weight of from about 15 to about 140 grams per square meter and a thickness of from about 1 mm to about 15 mm; and is comprised of fibers having a denier per filament greater than 2, with from 100 to about 50 percent by weight of the fibers being thermoplastic polymer fibers and from about 50 to 100 percent by weight of the fibers being bicomponent thermoplastic polymer fibers, in which the first component has a melting point which is at least about 50° C. lower than the melting point of the second component;

providing a second layer having a first side and a second side, the second layer comprising a carded web comprised of fibers having a denier per filament no greater than about 2 and a basis weight of at least about 15 grams per square meter, with from about 50 to 100 percent by weight of the fibers being bicomponent thermoplastic polymer fibers, in which the first component has a melting point which is at least about 50° C. lower than the melting point of the second component;

placing the first side of the second layer adjacent to and contiguous with the second side of the first layer;

through air bonding the first and second layers at a temperature sufficient to form a plurality of interfiber bonds between the first component of the bicomponent thermoplastic polymer fibers present in both layers and adjacent fibers in and between both layers; and applying a binder to the first side of the first layer at a level of from about 10 to about 50 percent by weight, based on the weight of the first layer, under conditions sufficient to provide less latex binder at the second side than at the first side and an amount of binder at the first side which is sufficient to permit multiple attachments of the first side of the first layer to and releases from the hooks without significant distortion of the fibers at the first side.

34. The method of claim 33, in which essentially all of the fibers of the first layer are bicomponent thermoplastic polymer fibers.

35. The method of claim 34, in which the bicomponent thermoplastic polymer fibers are sheath-core thermoplastic polymer fibers, with the sheath being comprised of the first component.

36. The method of claim 33, in which the bicomponent thermoplastic polymer fibers are polyester fibers.

37. The method of claim 33, in which the binder is present in the first layer at a level of from about 25 to about 45 percent by weight basis, based on the weight of the first layer.

38. The method of claim 33 which further comprises thermally pattern bonding the loop material.

39. The method of claim 36, in which the thermally pattern bonded area comprises from about 5 to about 30 percent of the total area of the loop material.

40. The method of claim 33 which further comprises applying a layer of a thermoplastic polymer on the second side of the second layer, which layer is present at a level of from about 10 to about 70 percent by weight, based on the weight of the first and second layers.

41. The method of claim 40 which further comprises applying a layer of an adhesive over the layer on the second side of the second layer and a layer of abrasive grains over the layer of adhesive under conditions sufficient to bond the adhesive grains to the layer on the second side of the second layer.

42. The method of claim 41 which further comprises applying a coating of a polymer over the layer of abrasive grains.

43. The method of claim 33, in which the binder is applied to the first side of the first layer by spraying.

\* \* \* \* \*